US011088926B2

(12) United States Patent
Zhang et al.

(10) Patent No.: US 11,088,926 B2
(45) Date of Patent: Aug. 10, 2021

(54) INSTANTIATION OF CLOUD-HOSTED FUNCTIONS BASED ON CALL TO FUNCTION GRAPH

(71) Applicant: Futurewei Technologies, Inc., Plano, TX (US)

(72) Inventors: Hong Zhang, Palo Alto, CA (US); Henry Louis Fourie, Livermore, CA (US); Farhad P. Sunavala, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 382 days.

(21) Appl. No.: 15/878,318

(22) Filed: Jan. 23, 2018

(65) Prior Publication Data
US 2019/0075154 A1  Mar. 7, 2019

Related U.S. Application Data

(60) Provisional application No. 62/553,637, filed on Sep. 1, 2017.

(51) Int. Cl.
*H04L 12/24* (2006.01)
*H04L 29/08* (2006.01)

(52) U.S. Cl.
CPC ........ *H04L 41/5041* (2013.01); *H04L 41/147* (2013.01); *H04L 41/5048* (2013.01);
(Continued)

(58) Field of Classification Search
CPC ... H04L 67/10; H04L 41/147; H04L 41/5048; H04L 41/5041; H04L 41/5096;
(Continued)

(56) References Cited

U.S. PATENT DOCUMENTS 5,410,704 A * 4/1995 Norden-Paul ........... G06F 16/40
718/101
6,817,019 B1   11/2004 Wang et al.
(Continued)

FOREIGN PATENT DOCUMENTS

| WO | WO-2005078612 A1 | 8/2005 |
| WO | WO-2014206702 A1 | 12/2014 |
| WO | WO-2017005329 A1 | 1/2017 |

OTHER PUBLICATIONS

"International Application No. PCT/CN2018/103457, International Search Report and Written Opinion dated Nov. 23, 2018", (dated Nov. 23, 2018), 9 pgs.
(Continued)

*Primary Examiner* — Lance Leonard Barry
(74) *Attorney, Agent, or Firm* — Schwegman Lundberg & Woessner, P.A.

(57) ABSTRACT

A system, computer-implemented method, and/or non-transitory computer-readable media may provide a warm start technique for cloud-hosted functions. A call is received from a web application. In response to the received call, a function graph is activated and includes a collection of functions associated with the web-application. The function graph also includes a plurality of states and transitions between the states. In response to the activation of the function graph, a cloud-hosted function associated with a particular state in the plurality of states included in the function graph is determined Before the particular state is triggered within the function graph to execute the cloud-hosted function, the determined cloud-hosted function is instantiated.

19 Claims, 12 Drawing Sheets

(52) U.S. Cl.
CPC .......... *H04L 67/10* (2013.01); *H04L 41/5096* (2013.01); *H04L 67/34* (2013.01)

(58) Field of Classification Search
CPC ..... H04L 67/34; H04L 67/1031; G06F 9/547; G06F 9/5072
See application file for complete search history.

(56) References Cited

U.S. PATENT DOCUMENTS

| | | | |
|---|---|---|---|
| 9,507,888 | B1 | 11/2016 | Aggarwal et al. |
| 2006/0143588 | A1* | 6/2006 | Sha .......................... G06F 30/30 716/102 |
| 2012/0101971 | A1 | 4/2012 | Raghavan et al. |
| 2014/0301192 | A1* | 10/2014 | Lee .......................... H04L 45/02 370/230 |
| 2016/0156513 | A1* | 6/2016 | Zhang ..................... H04L 67/10 709/220 |
| 2016/0188377 | A1 | 6/2016 | Thimmappa et al. |
| 2017/0086111 | A1* | 3/2017 | Vrzic .................. H04W 36/023 |
| 2017/0090961 | A1 | 3/2017 | Wagner et al. |
| 2017/0177860 | A1 | 6/2017 | Suarez et al. |
| 2017/0237656 | A1* | 8/2017 | Gage ................... H04L 61/2521 370/392 |
| 2018/0302277 | A1* | 10/2018 | Shimamura ......... H04L 41/5054 |

OTHER PUBLICATIONS

"European Application No. 18804218.8, Partial Supplementary European Search Report dated May 15, 2019", (dated May 15, 2019), 14 pgs.

"European Application No. 21160109.1. Extended European Search Report dated May 18, 2021", (May 18, 2021), 9 pgs.

\* cited by examiner

INSTANTIATION OF CLOUD-HOSTED FUNCTIONS BASED ON CALL TO FUNCTION GRAPH

FIELD OF THE INVENTION

The present disclosure relates to cloud-hosted functions, and more particularly to reducing latency related to the invocation of cloud-hosted functions.

BACKGROUND

The "cloud" is an abstraction that relates to resource management over a network and, more specifically, to a data center architecture that provides a platform for delivering services via a network. For example, the cloud may refer to various services delivered over the Internet such as network-based storage services or compute services. Typical cloud architecture deployments include a layered hierarchy that includes a physical layer of network hardware, and one or more software layers that enable users to access the network hardware. For example, one common type of cloud architecture deployment includes a physical layer of network resources (e.g., servers, storage device arrays, network switches, etc.) accompanied by a multi-layered hierarchical software framework that includes a first layer that implements Infrastructure as a Service (IaaS), a second layer that implements Platform as a Service (PaaS), and a third layer that implements Software as a Service (SaaS). In general, although there may be exceptions, resources in the third layer are dependent on resources in the second layer, resources in the second layer are dependent on resources in the first layer, and resources in the first layer are dependent on resources in the physical layer.

More recently, a serverless cloud architecture has been developed that enables users to execute functions in the cloud without provisioning resources in the traditional hierarchical structure described above. For example, Amazon Web Services (AWS) has developed a service referred to as Amazon® AWS Lambda that enables users to run code without provisioning or managing servers to run the code, like in a traditional compute service. Consequently, a web application can be developed that calls functions uploaded to the AWS Lambda service, where compute resources to execute the function are managed and provisioned by Amazon rather than the web application.

In some environments, in order to invoke a cloud-hosted function (also referred to herein as a cloud function), a request is sent from a server application to a function manager. The function manager processes the request by provisioning a container on a server or virtual machine that includes all of the resources (e.g. compute resource, storage resources, etc.) necessary to execute the cloud function. An image of the cloud function is then loaded into the container for execution. However, creating the container and loading the image of the cloud function into the container takes computation cycles and may introduce to the execution of the cloud function a latency of hundreds of milliseconds. The latency increases the delay between receiving the request and returning a result from the cloud function to the server application. There is a need to reduce the latency associated with the invocation of cloud-hosted functions.

SUMMARY

A system is provided for a warm start technique for cloud-hosted functions. Included is a non-transitory memory storage comprising instructions, and one or more processors in communication with the memory, wherein the one or more processors execute the instructions to activate a function graph, the function graph including a plurality of states and transitions between the states. The one or more processors additionally execute the instructions to determine a cloud-hosted function associated with a particular state in the plurality of states included in the function graph, in response to the activation of the function graph. The one or more processors further execute the instructions to cause instantiation of the determined cloud-hosted function, before the particular state is triggered within the function graph to execute the cloud-hosted function.

Also provided is a computer-implemented method for a warm start technique for cloud-hosted functions. A function graph is activated, where the function graph includes a plurality of states and transitions between the states. Additionally, in response to the activation of the function graph, a cloud-hosted function associated with a particular state in the plurality of states included in the function graph is determined. Further, before the particular state is triggered within the function graph to execute the cloud-hosted function, instantiation of the determined cloud-hosted function is caused.

A non-transitory computer-readable media is further provided which stores computer instructions that when executed by one or more processors, cause the one or more processors to perform steps for enabling repeat performance of a prior performed task within an application based on a current context of a mobile device. The steps include activation of a function graph, the function graph including a plurality of states and transitions between the states. The steps additionally include, in response to the activation of the function graph, determining a cloud-hosted function associated with a particular state in the plurality of states included in the function graph. The steps further include, before the particular state is triggered within the function graph to execute the cloud-hosted function, causing instantiation of the determined cloud-hosted function.

A system is also provided which comprises a function graph controller. The function graph controller is configured to activate a function graph, the function graph including a plurality of states and transitions between the states. The function graph controller is further configured to determine a cloud-hosted function associated with a particular state in the plurality of states included in the function graph, in response to the activation of the function graph. The function graph controller is additionally configured to cause instantiation of the determined cloud-hosted function, before the particular state is triggered within the function graph to execute the cloud-hosted function.

Optionally, in any of the preceding embodiments, the function graph is activated within a cloud computing environment from a manual command or from a triggering event.

Optionally, in any of the preceding embodiments, the particular state in the plurality of states included in the function graph is any state in the plurality of states included in the function graph, such that all cloud-hosted functions associated with the plurality of states included in the function graph are determined directly upon the activation of the function graph for instantiation thereof.

Optionally, in any of the preceding embodiments, the cloud-hosted function is determined by: identifying the current state within the function graph, determining the particular state as predefined number of transitions away within the function graph from the current state, and identifying the cloud-hosted functions as associated with the particular state. As a further option, the predefined number of transitions is one, such the particular state is determined as a next state to which the current state is capable of transitioning within the function graph.

Optionally, in any of the preceding embodiments, the cloud-hosted function is determined by: identifying the current state triggered within the function graph, determining, from the current state, a plurality of possible transition paths within the function graph, predicting that a particular transition path of the plurality of possible transition paths will be used in association with the activation of the function graph, determining the particular state as included in the particular transition path, and identifying the cloud-hosted functions as associated with the particular state. As a further option, the particular transition path is predicted as being used in association with the activation of the function graph, based on historical statistical information collected from prior executions of the function graph.

Optionally, in any of the preceding embodiments, the cloud-hosted function is determined by: identifying the current state within the function graph, and determining that the current state has one or more associated cloud-hosted functions.

Optionally, in any of the preceding embodiments, instantiating the determined cloud-hosted function includes creating a container for the cloud-hosted function within a cloud computing environment, the container being an execution environment for cloud-hosted function, loading an image of the cloud-hosted function within the container, and initializing a runtime for the cloud-hosted function.

Optionally, in any of the preceding embodiments, instantiating the determined cloud-hosted function includes creating an instance of the cloud-hosted function within a cloud computing environment.

Optionally, in any of the preceding embodiments, the one or more processors additionally execute the instructions to execute the cloud-hosted function when the particular state is triggered within the function graph.

Optionally, in any of the preceding embodiments, the one or more processors additionally execute the instructions to release the instantiation of the cloud-hosted function from within a cloud computing environment, when determining that the function graph has terminated.

A system is provided for a warm start technique for cloud-hosted functions. Included is a non-transitory memory storage comprising instructions, and one or more processors in communication with the memory, wherein the one or more processors execute the instructions to identify a cloud-hosted function configured to be executed within a cloud computing environment. The one or more processors additionally execute the instructions to determine a hold (preservation) time to maintain an instantiation of the cloud-hosted function within the cloud computing environment, based on a plurality of metrics calculated for the cloud-hosted function. The one or more processors further execute the instructions to maintain the instantiation of the cloud-hosted function within the cloud computing environment for the determined hold time, after instantiating the cloud-hosted function within the cloud computing environment. In one embodiment, the hold time is the length of time that an instance of the cloud-hosted function is maintained in a warm-start mode after the execution of the cloud-hosted function is complete.

Also provided is a computer-implemented method for a warm start technique for cloud-hosted functions. A cloud-hosted function configured to be executed within a cloud computing environment is identified. Additionally, a hold time to maintain an instantiation of the cloud-hosted function within the cloud computing environment is determined, based on a plurality of metrics calculated for the cloud-hosted function. Further, after instantiating the cloud-hosted function within the cloud computing environment, the instantiation of the cloud-hosted function is maintained within the cloud computing environment for the determined hold time.

A non-transitory computer-readable media is further provided which stores computer instructions that when executed by one or more processors, cause the one or more processors to perform steps for a warm start technique for cloud-hosted functions. The steps include identifying a cloud-hosted function configured to be executed within a cloud computing environment. The steps additionally include determining a hold time to maintain an instantiation of the cloud-hosted function within the cloud computing environment, based on a plurality of metrics calculated for the cloud-hosted function. The steps further include, after instantiating the cloud-hosted function within the cloud computing environment, maintaining the instantiation of the cloud-hosted function within the cloud computing environment for the determined hold time.

Optionally, in any of the preceding embodiments, the hold time to maintain the instantiation of the cloud-hosted function within the cloud computing environment is determined utilizing a predefined function that: receives, as input, the metrics calculated for the cloud-hosted function, processes the metrics to determine the hold time, and outputs the determined hold time.

Optionally, in any of the preceding embodiments, the metrics include an image size of the cloud-hosted function.

Optionally, in any of the preceding embodiments, the metrics include memory allocation required for the cloud-hosted function.

Optionally, in any of the preceding embodiments, the metrics include an execution duration for the cloud-hosted function.

Optionally, in any of the preceding embodiments, the metrics include an interval between sequential arrivals of events that trigger the cloud-hosted function.

Optionally, in any of the preceding embodiments, the metrics are calculated using historical information collected from prior executions of the cloud-hosted function within the cloud computing environment.

Optionally, in any of the preceding embodiments, instantiating the cloud-hosted function within the cloud computing environment includes creating an instance of the cloud-hosted function within the cloud computing environment. As a further option the instance of the cloud-hosted function may be maintained within the cloud computing environment for a period of time after it completes its normal execution.

Optionally, in any of the preceding embodiments, instantiating the cloud-hosted function within the cloud computing environment includes: creating a container for the cloud-hosted function within a cloud computing environment, the container being an execution environment for cloud-hosted function, loading an image of the cloud-hosted function within the container, and initializing a runtime for the cloud-hosted function. As a further option, maintaining the instance of the cloud-hosted function within the cloud computing environment includes maintaining the container, the image of the cloud-hosted function within the container, and the runtime environment.

Optionally, in any of the preceding embodiments, the one or more processors additionally execute the instructions to determine that the hold time has elapsed without the cloud-hosted function being executed within the cloud computing environment, and in response to determining that the hold time has elapsed without the cloud-hosted function being executed within the cloud computing environment, release the instantiation of the cloud-hosted function from within the cloud computing environment.

To this end, in some optional embodiments, one or more of the foregoing features of the aforementioned system, computer-implemented method, and/or non-transitory computer-readable media may provide a warm start technique for cloud-hosted functions. This warm start technique may reduce latency associated with a time to execution of a cloud-hosted function, such as by determining a cloud-hosted function associated with an activated function graph and instantiating the cloud-hosted function ahead of its execution in association with the activated function graph (e.g. in anticipation of a later requested execution of the cloud-hosted function), and/or maintaining an already instantiated cloud-hosted function for hold time that is dynamically determined for the cloud-hosted function (in anticipation of a later requested execution of the cloud-hosted function being made during that hold time). It should be noted that the aforementioned potential advantages are set forth for illustrative purposes only and should not be construed as limiting in any manner.

DETAILED DESCRIPTION

Function graphs orchestrate cloud-hosted functions into a coordinated micro-service application. Function graphs represent a state machine model driven by events from a wide variety of sources that control the execution of the cloud-hosted functions in a prescribed manner. Function graphs permit a user to arrange cloud-hosted functions to execute in sequence or concurrently, manage error conditions by invoking function calls, handle scaling to accommodate varying event loads, and the like. A function graph controller allows for the instantiation and dispatch of multiple state machine instances, which implement a state machine model as defined by a function graph.

Function graphs also allow a user to define rendezvous points (i.e., states) to wait for pre-defined events before executing a cloud-hosted function and progressing through the function graph. The advantages of coordinating the execution of cloud-hosted functions with function graphs is that the function graphs provide a consistent framework for managing cloud-hosted functions without the user having to solve the coordination problems on their own. The invocation of a cloud-hosted function can be triggered at the entry into a particular state, the exit out of a particular state, or the occurrence of an event within a particular state.

Conventionally, the triggering of a cloud-hosted function would result in a request being transmitted to a function manager to provision a container to execute the cloud-hosted function, execute the cloud-hosted function, and then return the result to the function graph controller, which can forward the result to a server application associated with the function graph instance. The latency associated with provisioning the container and preparing the cloud-hosted function for execution can be reduced, however, by instantiating the cloud-hosted function ahead of time in anticipation of a later invocation of (request to execute) the cloud-hosted function. In one embodiment, function graph can be used to efficiently manage the warm start (i.e., early instantiation) of cloud-hosted functions within the function manager.

Figure 1A:
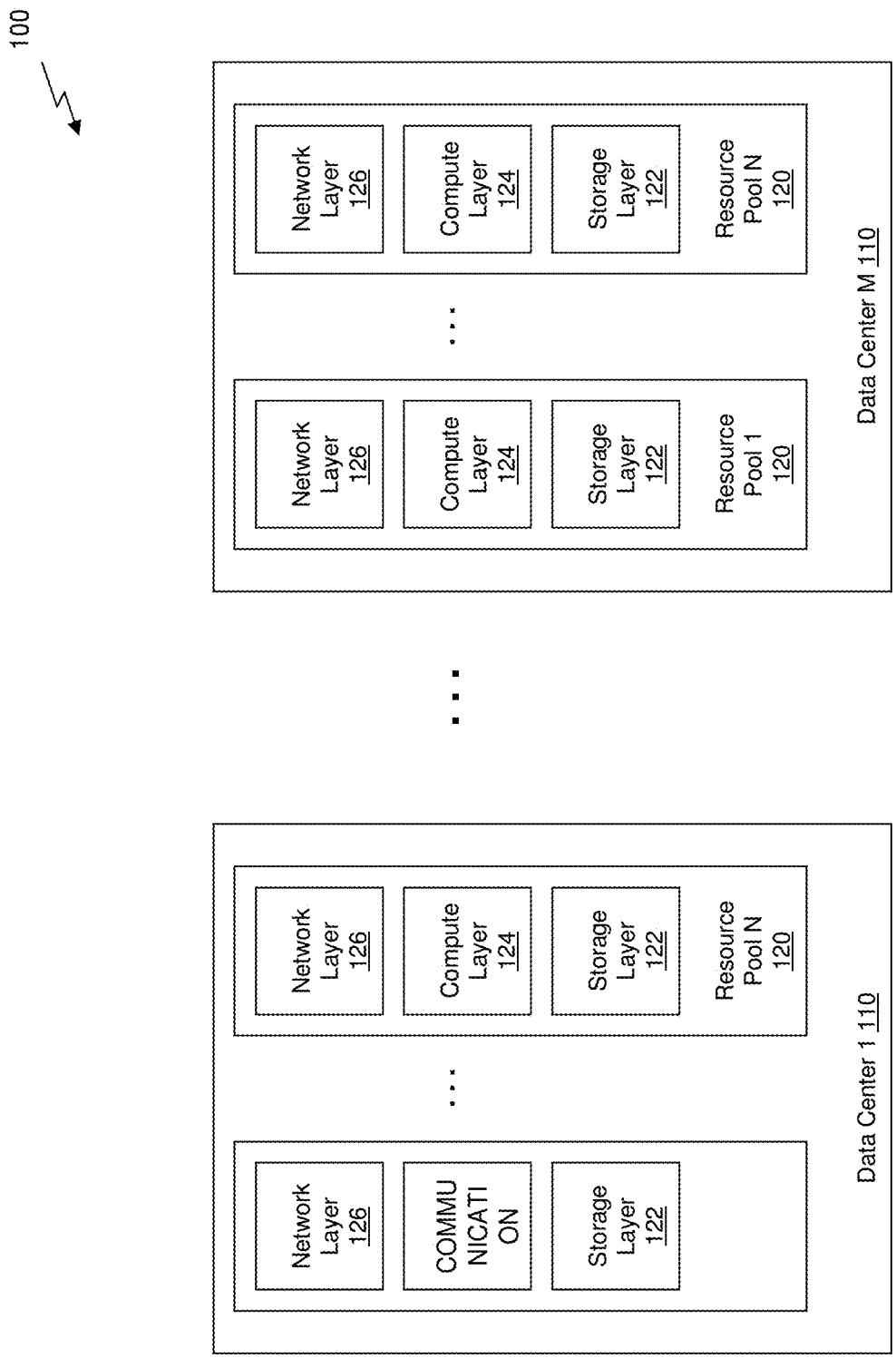
FIGS. 1A and 1B illustrate the infrastructure for implementing a cloud, in accordance with the prior art.
Figure 1B:
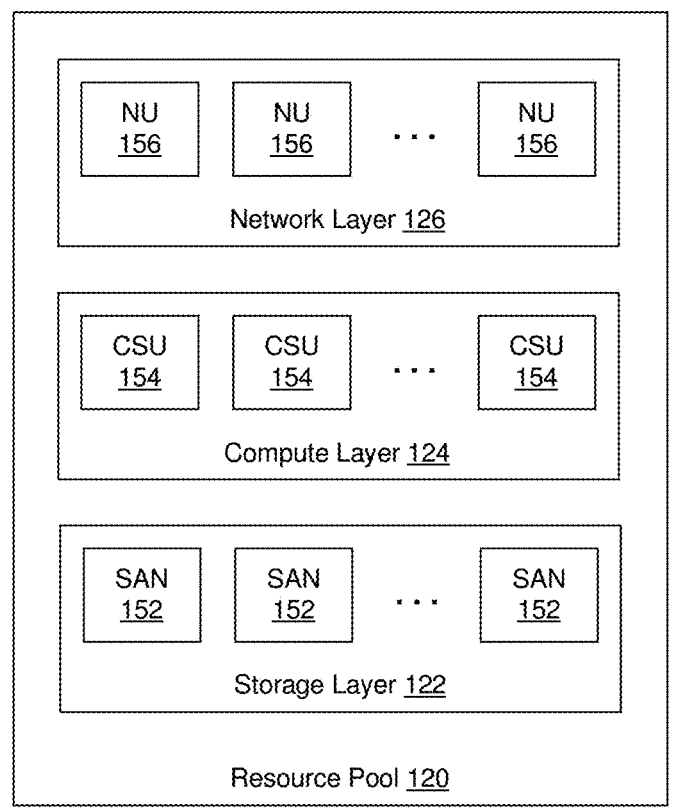

FIGS. 1A and 1B illustrate the infrastructure for implementing a cloud 100, in accordance with the prior art. The cloud 100, as used herein, refers to the set of hardware resources (compute, storage, and networking) located in one or more data centers (i.e., physical locations) and the software framework to implement a set of services across a network, such as the Internet. As shown in FIG. 1A, the cloud 100 includes a plurality of data centers 110, each data center 110 in the plurality of data centers 110 including one or more resource pools 120. A resource pool 120 includes a storage component 122, a compute component 124, and a network component 126.

As shown in FIG. 1B, the storage layer 122 includes the physical resources to store instructions and/or data in the cloud 100. The storage layer 122 includes a plurality of storage area networks (SAN) 152, each SAN 152 provides access to one or more block level storage devices. In one embodiment, a SAN 152 includes one or more non-volatile storage devices accessible via the network. Examples of non-volatile storage devices include, but are not limited to, hard disk drives (HDD), solid state drives (SSD), flash memory such as an EEPROM or Compact Flash (CF) Card, and the like. In another embodiment, a SAN 152 is a RAID (Redundant Array of Independent Disks) storage array that combines multiple, physical disk drive components (e.g., a number of similar HDDs) into a single logical storage unit. In yet another embodiment, a SAN 152 is a virtual storage resource that provides a level of abstraction to the physical storage resources such that a virtual block address may be used to reference data stored in one or more corresponding blocks of memory on one or more physical non-volatile storage devices. In such an embodiment, the storage layer 122 may include a software framework, executed on one or more processors, for implementing the virtual storage resources.

The compute component 124 includes the physical resources to execute processes (i.e., sets of instructions) in the cloud 100. The compute component 124 may include a plurality of compute units 154, each compute unit 154 including at least one processor and a software framework for utilizing the at least one processor. In one embodiment, a compute unit 154 includes one or more servers (e.g., blade servers) that provide physical hardware to execute sets of instructions. Each server may include one or more processors (e.g., CPU(s), GPU(s), ASIC(s), FPGA(s), DSP(s), etc.) as well as volatile memory for storing instructions and/or data to be processed by the one or more processors. The compute unit 154 may also include an operating system, loaded into the volatile memory and executed by the one or more processors, that provides a runtime environment for various processes to be executed on the hardware resources of the server. In another embodiment, a compute unit 154 is a virtual machine that provides a collection of virtual resources that emulate the hardware resources of a server. The compute layer 124 may include a hypervisor or virtual machine monitor that enables a number of virtual machines to be executed substantially concurrently on a single server.

The networking component 126 includes the physical resources to implement networks. In one embodiment, the networking layer 126 includes a number of switches and/or routers that enable data to be communicated between the different resources in the cloud 100. For example, each server in the compute layer 124 may include a network interface controller (NIC) coupled to a network interface (e.g., Ethernet). The interface may be coupled to a network switch that enables data to be sent from that server to another server connected to the network switch. The networking layer 126 may implement a number of layers of the OSI model, including the Data Link layer (i.e., layer 2), the Networking layer (i.e., layer 3), and the Transport layer (i.e., layer 4). In one embodiment, the networking layer 126 implements a virtualization layer that enables virtual networks to be established within the physical network. In such embodiments, each network unit (NU) 156 in the network layer 126 is a virtual private network (VPN).

It will be appreciated that each data center 110 in the plurality of data centers may include a different set of hardware resources and, therefore, a different number of resource pools 120. Furthermore, some resource pools 120 may exclude one or more of the storage layer 122, compute layer 124, and/or network layer 126. For example, one resource pool 120 may include only a set of servers within the compute layer 124. Another resource pool 120 may include both a compute layer 124 and network layer 126, but no storage layer 122.

Figure 2:
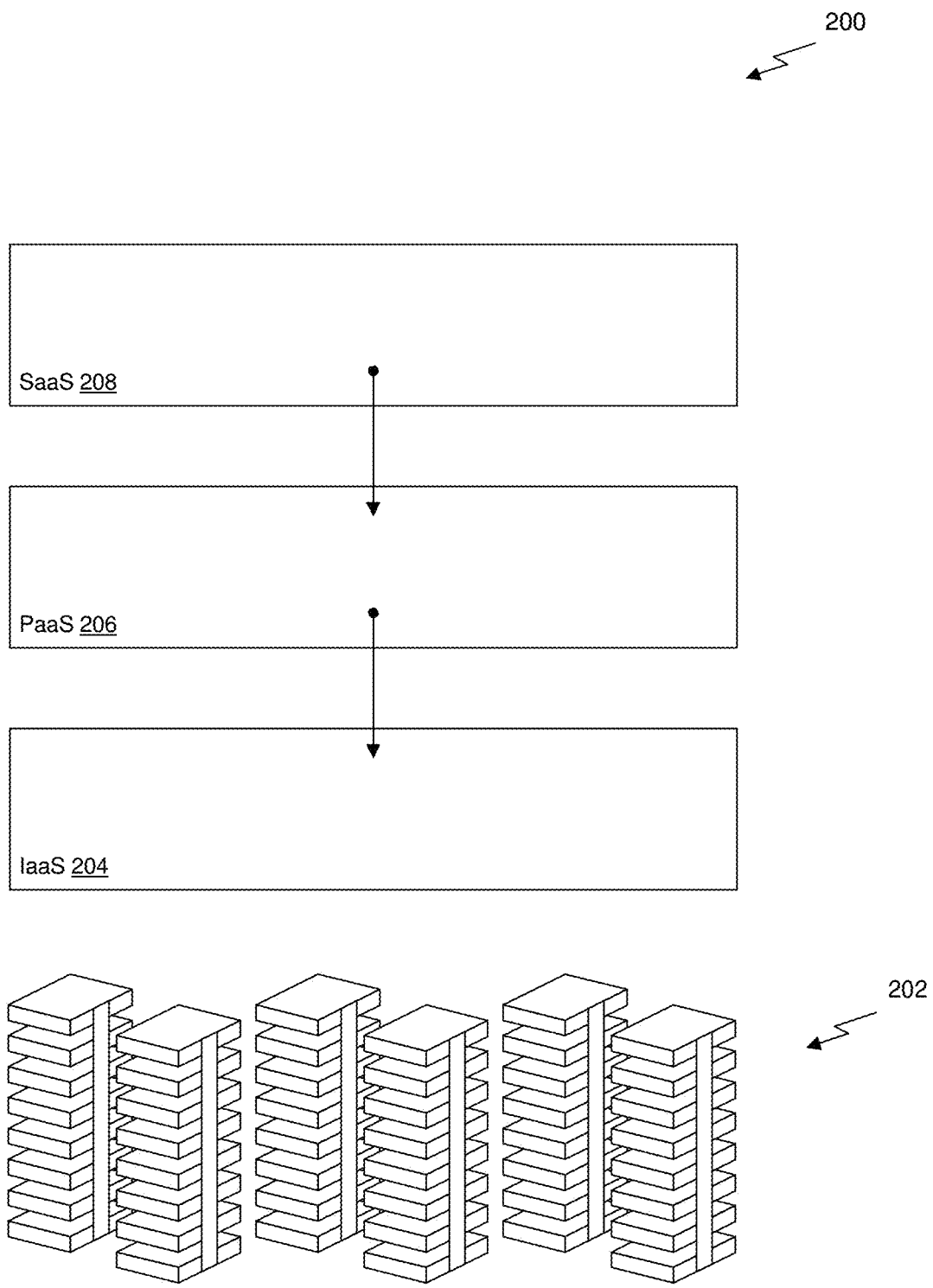
FIG. 2 is a conceptual illustration of a cloud architecture, in accordance with the prior art.

FIG. 2 is a conceptual illustration of a cloud architecture 200, in accordance with the prior art. As shown in FIG. 2, the cloud architecture 200 is represented as a plurality of hierarchical layers. The cloud architecture 200 includes a physical layer 202, an Infrastructure as a Service (IaaS) layer 204, a Platform as a Service (PaaS) layer 206, and a Software as a Service (SaaS) layer 208. The physical layer 202 is the collection of hardware resources that implement the cloud. In one embodiment, the physical layer 202 is implemented as shown in FIGS. 1A and 1B.

Figure 3:
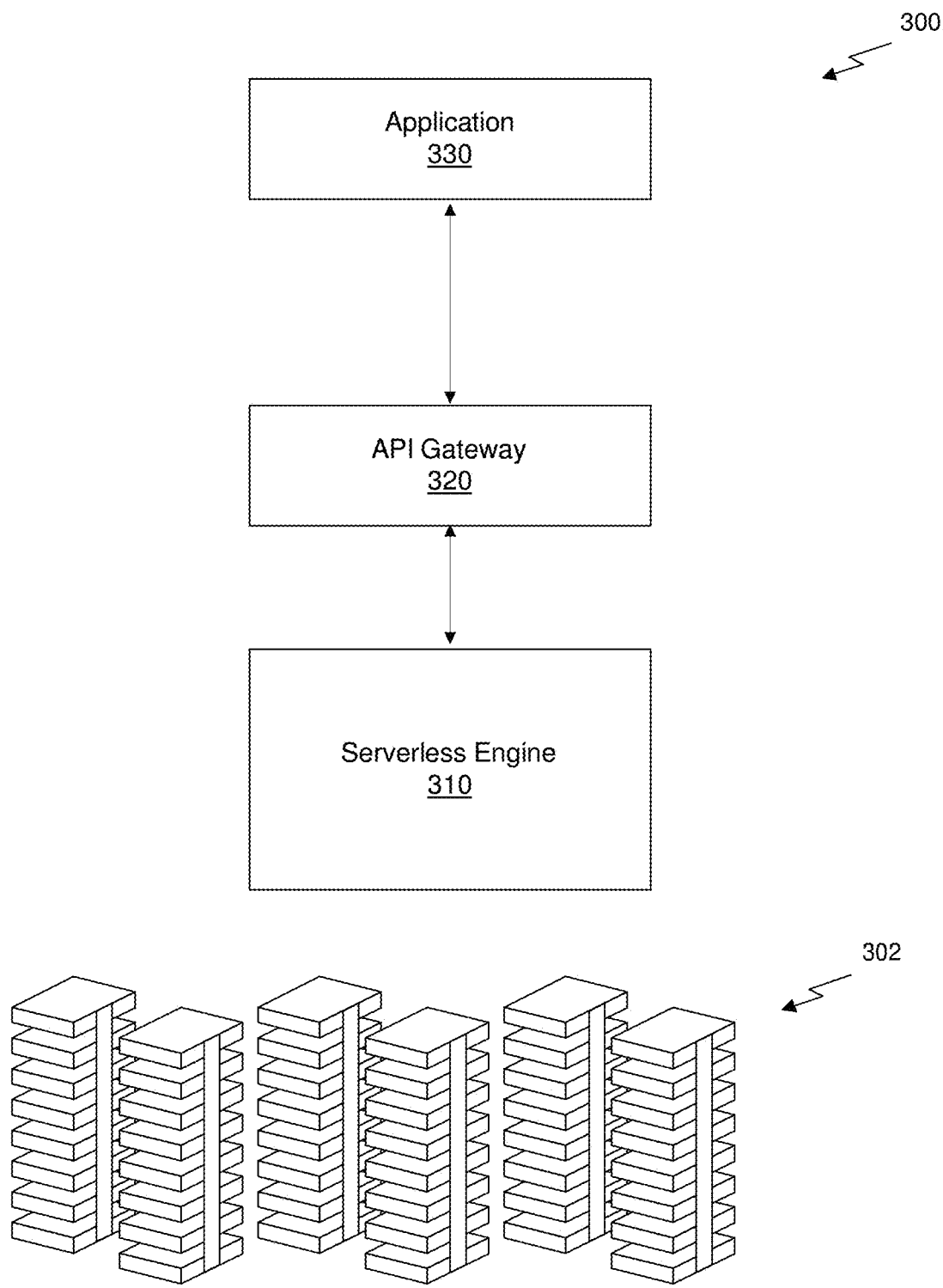
FIG. 3 is a conceptual illustration of a serverless cloud architecture, in accordance with the prior art.

FIG. 3 is a conceptual illustration of a serverless cloud architecture 300, in accordance with the prior art. As shown in FIG. 3, the serverless cloud architecture 300 does not have the same hierarchical structure as a traditional cloud architecture, as shown in FIG. 2. The physical layer 302 is the collection of hardware resources that implement the cloud. In one embodiment, the physical layer 302 is implemented as shown in FIGS. 1A and 1B.

The serverless cloud architecture 300 includes a serverless engine 310 which manages the execution of functions using the hardware resources of the physical layer 302. In one embodiment, the serverless engine 310 includes a hypervisor that manages one or more virtual machines executed on resources in the physical layer 302. The serverless engine 310 runs software on each virtual machine that includes one or more containers for executing various functions. The serverless engine 310 is configured to execute the functions based on function calls received from an API Gateway 320.

An application 330 may call a function by making a function call. In one embodiment, a function call is implemented by making a RESTful API call to an endpoint associated with the API Gateway 320. As is known in the art, standard Hypertext Transfer Protocol (HTTP) methods may be used with a Uniform Resource Locator (URL) to specify a function identified by the URL. The API Gateway 320 may receive function calls from the application 330, which triggers the execution of the corresponding function by the serverless engine 310.

It will be appreciated that the term serverless does not refer to the fact that the cloud architecture 300 does not include servers, but rather the term serverless refers to the fact that the function caller does not need to provision server resources for executing the function as the provisioning is handled by the serverless engine 310. Furthermore, it will be appreciated that the serverless engine 310 may be built upon conventional cloud architectures such that the provisioning of virtual machines, for example, utilizes conventional services in the IaaS layer 204 or PaaS layer 206.

Figure 4:
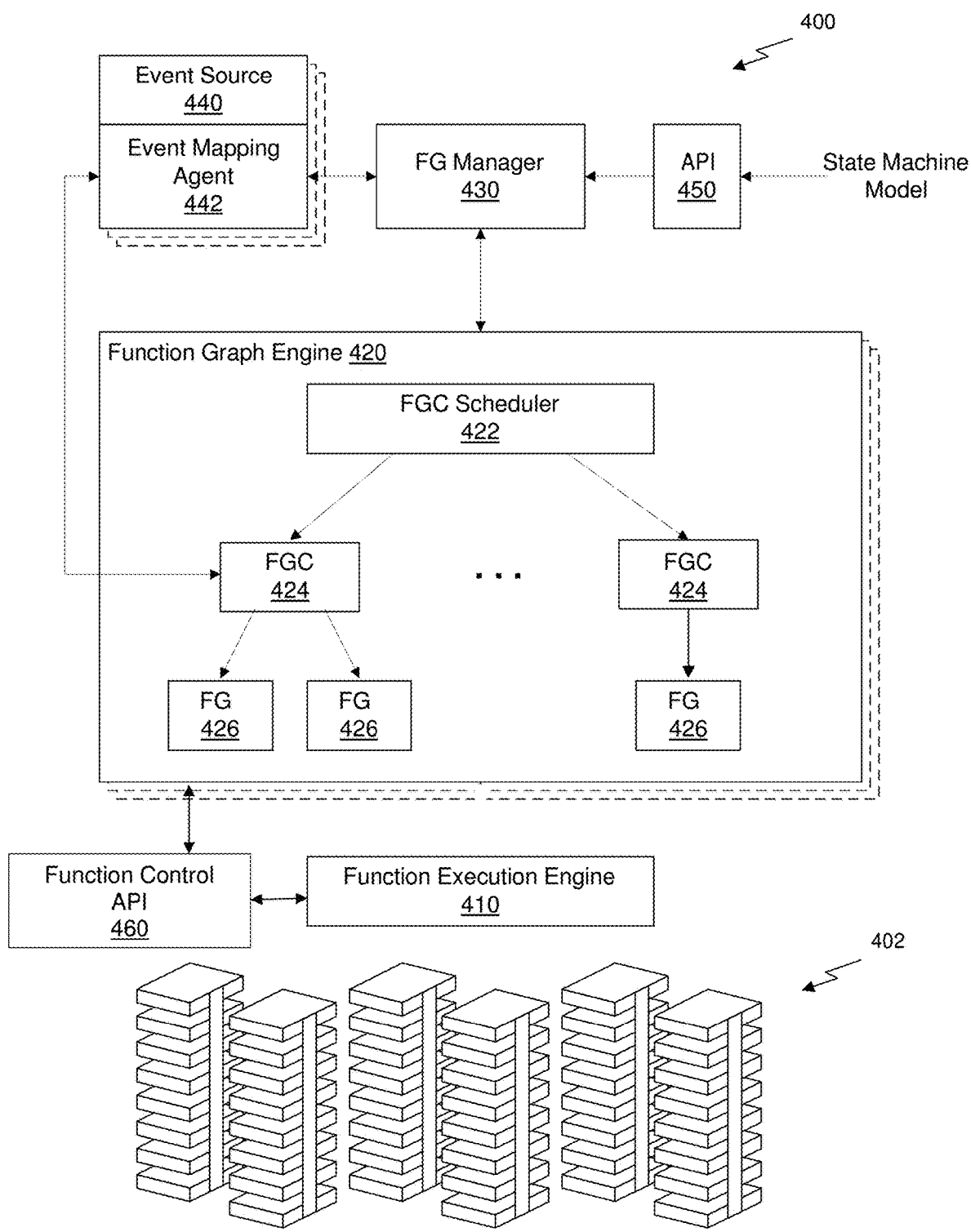
FIG. 4 is a conceptual illustration of a serverless cloud architecture, in accordance with one embodiment.

FIG. 4 is a conceptual illustration of a serverless cloud architecture 400, in accordance with one embodiment. As shown in FIG. 4, the serverless cloud architecture 400 does not have the same hierarchical structure as a traditional cloud architecture, as shown in FIG. 2. The physical layer 402 is the collection of hardware resources that implement the cloud. In one embodiment, the physical layer 402 is implemented as shown in FIGS. 1A and 1B. It should be noted that the serverless cloud architecture 400 shown in FIG. 4 is only an example of one possible serverless cloud architecture, and other serverless cloud architectures may be utilized in association with the embodiments described herein, such as architectures based on replicated state machines using the Raft consensus algorithm or Paxos.

The serverless cloud architecture 400 is configured to enable execution of a plurality of cloud-hosted functions based on a state machine model that transitions in response to events. The state machine model may be defined using a service graph, which is a file that includes a representation of the state machine model written in a service graph language. The state machine model comprises states, actions, and events defined in a hierarchical structure. The actions may include function invocation, payload processing, holding for a delay period, transitioning to a next state, or termination of the state machine. In one embodiment, the service graph language is a JSON representation of a state machine model. In another embodiment, the service graph language is a proprietary language having a syntax for defining the state machine model.

The serverless cloud architecture 400 includes a function execution engine 410, a function graph engine 420, a function graph (FG) manager 430, and one or more event sources 440. It should be noted that various components described herein, including the function execution engine 410, function graph engine 420, function graph (FG) manager 430, and one or more event sources 440, may in one embodiment be means in the form of separate modules that perform the functionality described herein. These components may each include, but are not limited to, at least one processor (to be described later) and any software controlling the same, and/or any other circuitry capable of the aforementioned functionality.

The function execution engine 410 manages the provisioning of resources in the physical layer 402 to execute cloud-hosted functions. For example, the function execution engine 410 receives function calls from the function graph engine 420, provisions a container to handle the execution of the function(s), transfers payload data to the node in the cloud associated with the container, executes the function(s), and directs result payload data to a destination location. Functions may be written in a variety of languages (e.g., Java, Python, C++, etc.), which is compiled into binary executable or compiled at runtime, and executed in a container that isolates the function and resources allocated to the function from other functions.

The function graph engine 420 includes a function graph controller (FGC) scheduler 422, one or more function graph controllers (FGCs) 424, and one or more function graph instances (FGs) 426 associated with each FGC 424. Each FGC 424 is configured to manage one or more FG instances 426, which implement a state machine model for a particular invocation of a function graph. A function graph defined by a user may be invoked by a call included in a web-application. For example, a web-application may include an HTTP request associated with a URI corresponding with the function graph. In response to the HTTP request, a new FG instance 426 will be created to implement the state machine model defined by the function graph for the web-application.

The FGC scheduler 422 is configured to provision as many FGCs 424 as necessary to handle the dynamic traffic associated with a particular function graph (i.e., a collection of functions associated with a web-application). As an example, a user creates a web-application that includes a call to the function graph. The user uploads the function graph definition to the cloud, which is parsed to create a state machine model specification. The function graph engine 420 is configured to provision and manage a number of FG instances 426 as clients load and execute the web-application on client machines thereby running code on the client machine that includes the call to the function graph. Each FGC 424 and a number of FG instances 426 may be hosted on a different node (i.e., server) in the cloud. The FGC scheduler 422 may manage the instantiation of the FGCs 424 on various nodes in response to the traffic generated by the web-application, scaling up and down the number of FGCs 424 as needed. In one embodiment, the FGC scheduler 422 for a particular function graph is provisioned with a particular URI that enables the web-application to make a call to the FGC scheduler 422 to execute a function graph micro-service. The FGC scheduler 422 creates a new FG instance 426 to handle the call by transmitting a message to one of the FGCs 424. The FGC scheduler 422 may also pass a payload received from the web-application to the FG instance 426 via the FGC 424 so that the FG instance 426 can process the payload according to the function graph. Once the function graph has completed processing the payload, the FG instance 426 transmits the result payload to the FGC scheduler 422 to be transmitted back to the web-application that made the call and the FG instance 426 may be deleted.

The FG manager 430 invokes one or more function graph engines 420 on various nodes in the cloud. Each function graph engine 420 may be associated with a different function graph created by a plurality of different users for a plurality of different web-applications. Furthermore, the FG manager 430 may invoke multiple function graph engines 420 for a single function graph to scale up the serverless cloud architecture for extremely large web-applications. The FG manager 430 is a centralized logic module that performs load balancing and scales in and out the number of FGCs 424 for each function graph. The FG manager 430 receives function graphs via an API 450 that implements a state machine model specification. The function graph, as written in a particular function graph language, may be read by a parser and converted to a state machine model specification according to the API 450 in order to implement the state machine model via the FG instances 426.

The FG manager 430 also configures the Event Mapping Agent 442 which maps event sources 440 to FG instances 426. The cloud may include a number of event sources 440. Event sources 440 refer to any components in the cloud that are associated with events. Examples of event sources 440 include, but are not limited to, network storage devices, databases, API Gateways, and the like. Examples of events include, but are not limited to, a file event (e.g., storing an image on a cloud storage device), a table event (e.g., adding an entry to a database), or a protocol event (e.g., receiving an HTTP request at an API Gateway). Events may be used to trigger actions in states of the state machine model. In other words, an action may not be executed immediately when entering a particular state, but instead the action is only executed in response to the occurrence of one or more events after the state is entered.

In one embodiment, in order to monitor the events, the FG manager 430 creates an event mapping agent 442 in each event source 440 referenced by a function graph. The event mapping agent 442 is a software module that is configured to retrieve a mapping table of events-to-FGCs and set up a communication channel between the event source 440 and one or more FGCs 424. In one embodiment, the FG manager 430 generates a mapping table that correlates events with FGCs 424 based on the state machine model specification corresponding to a function graph. A particular state machine model specification is used to instantiate (i.e., configure) a particular function graph engine 420, which includes a number of FGCs 424. Each FGC 424 may be referenced using a particular uniform resource identifier (URI) that enables other components of the serverless cloud architecture 400 to communicate directly with the FGCs 424. Each event mapping agent 442 may then establish a TCP/IP connection with one or more FGCs 424 using the URIs corresponding with the FGCs 424. The event mapping agent 430 can then be configured by the FG manager 430 to detect one or more events in a corresponding event source 440. After detecting an event, the event mapping agent 430 then transmits a message directly to the one or more FGCs 424 corresponding with the event.

In an alternative embodiment, the event mapping agent 442 may be a centralized component that polls a plurality of different event sources 440 to detect events. The centralized event mapping agent 442 may then transmit messages related to the events to the one or more FGCs 424.

Each FG instance 426 is configured to implement an instance of the state machine model. The FG instance 426 is activated (i.e. invoked, called, etc.) and transitions to an initial state. The FG instance 426 then runs, processing payload data received in association with the activation, while transitioning between states as defined by the state machine model. Actions in each state may be triggered in response to one or more events. Actions may include invoking a function call of a cloud-hosted function executed by the function execution engine 410. Actions may also be triggered when results are received from the cloud-hosted functions. Again, the state machine model implemented by the FG instance 426 is used to coordinate execution of cloud-hosted functions in a micro-service application.

Figure 5:
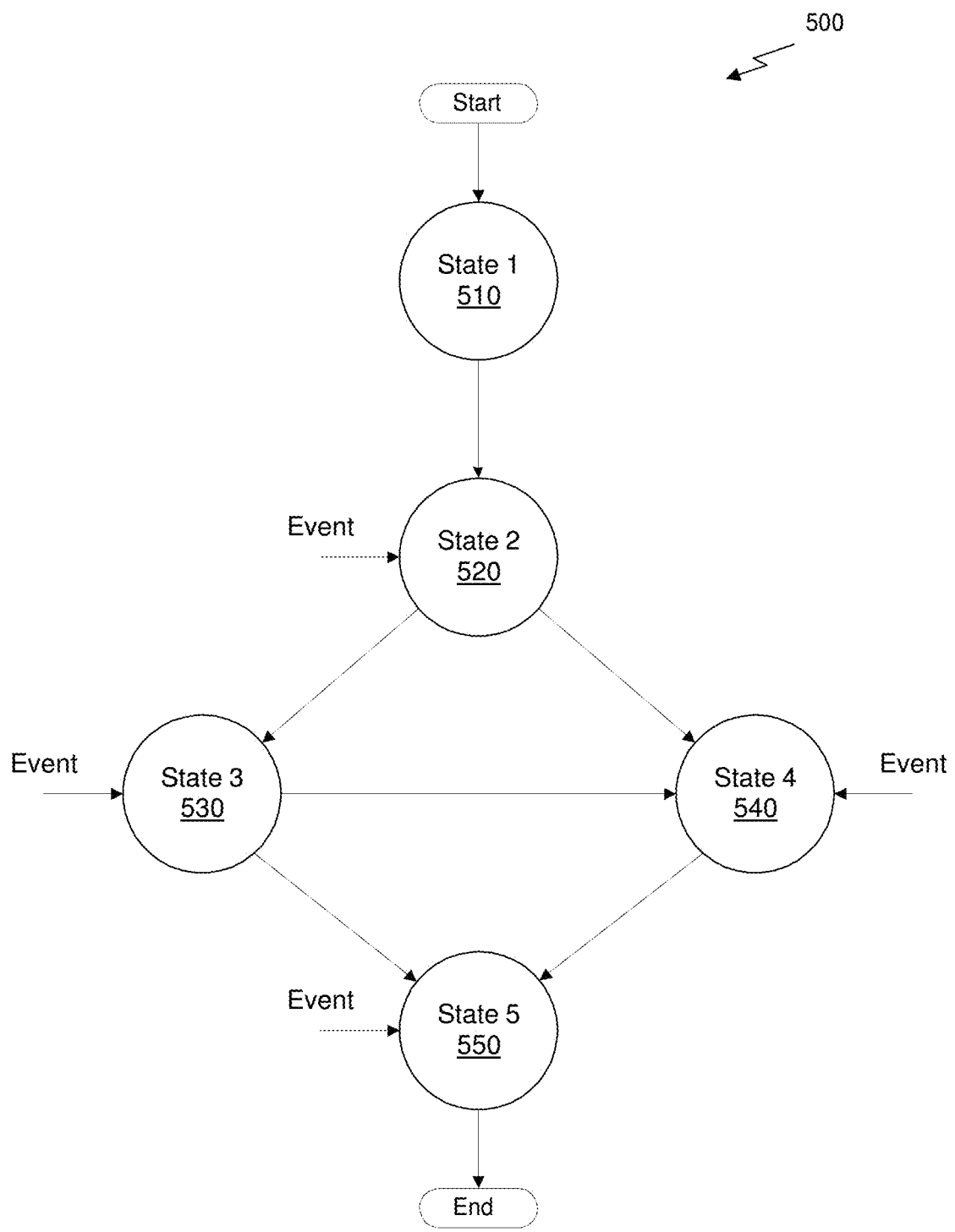
FIG. 5 is a conceptual diagram of a state machine model, in accordance with one embodiment.

FIG. 5 is a conceptual diagram of a state machine model 500, in accordance with one embodiment. It will be appreciated that the state machine model 500 of FIG. 5 is only provided as an example, and state machine models as defined by various users may include a different topology of states and transitions between states. As shown in FIG. 5, the state machine model 500 includes five states: a first state 510, a second state 520, a third state 530, a fourth state 540, and a fifth state 550. A call to invoke an instance of the state machine model 500 is received by the function graph (FG) manager 430. The FG manager 430 may create event mapping agents in one or more event sources 440, as needed, based on any events associated with the states in the state machine model 500. In one embodiment, the call may be made in response to a client machine loading and running client-side code such as javascript that generates an HTTP request to a URL associated with the state machine model 500. The FG manager 430 is also configured to transmit a message to the FGC scheduler 422 to create a new instance of an FG 426 corresponding to the call. The FGC scheduler 422 may direct one of the existing FGCs 424 or create a new FGC 424 to instantiate the new instance of the FG 426. Once the FG instance 426 corresponding to the call is running, the state machine enters the first state 510.

Each state can be associated with one or more actions. Actions may include calling a cloud-hosted function, processing a payload, delaying an action for a time period, transitioning to a next state, or termination of the state machine. Actions can be invoked when a state is entered, when one or more events have occurred, after a delay, when a result from a function call is received, after an error (e.g., a function call timeout), or on exiting the state. In many states, an action is invoked only after one or more events occur. Actions can be gated (i.e., blocked from execution) until multiple events occur (i.e., as combined with AND logic) or until any one of two or more events occur (i.e., as combined with OR logic). Again, notification of the occurrence of events is received at an FGC 424 from one or more event mapping agents 442.

As shown in FIG. 5, when an FG instance 426 is created, the state machine model 500 enters an initial state, such as the first state 510. The first state 510 may define actions that are executed upon entry into the first state 510 or after one or more events have occurred. The first state 510 may also specify conditions for transitioning to another state. In one embodiment, the state machine model can transition to another state when a result is returned from a function specified by an action invoked within the state. In another embodiment, the state machine model can transition to another state based on the receipt of one or more events from the event mapping agents 442 (i.e., from the event sources 440).

The state machine model 500 shows one transition from the first state 510 to the second state 520. However, a single state may include logic for two or more transitions to different states as well. For example, a first transition can be defined from the second state 520 to the third state 530 in response to the occurrence of a first event, and a second transition can be defined from the second state 520 to a fourth state 540 in response to the occurrence of a second event. The arrival of events at the FG instance 426 triggers an action and/or a transition to another state. In other words, if the current state is the second state 520, then the next state of the state machine model will depend on the occurrence of specific events. As shown in FIG. 5, the third state 530 includes a first transition to the fourth state 540 and a second transition to the fifth state 550; the fourth state 540 includes a transition to the fifth state 550; and the fifth state 550 includes a transition to terminate the state machine model 500.

It will be appreciated that an FG instance 426 is configured to implement the logic of a state machine model, calling functions in response to events, transitioning between states, processing payloads received from a client, one or more events, a result of an action, and so forth. In one embodiment, the FG instance 426 is an object invoked using a state machine model specification as input in order to configure the FG instance 426 to implement the state machine model defined by the state machine model specification, which defines the states of the state machine model as well as the events and actions associated with each state and transitions between states.

Figure 6:
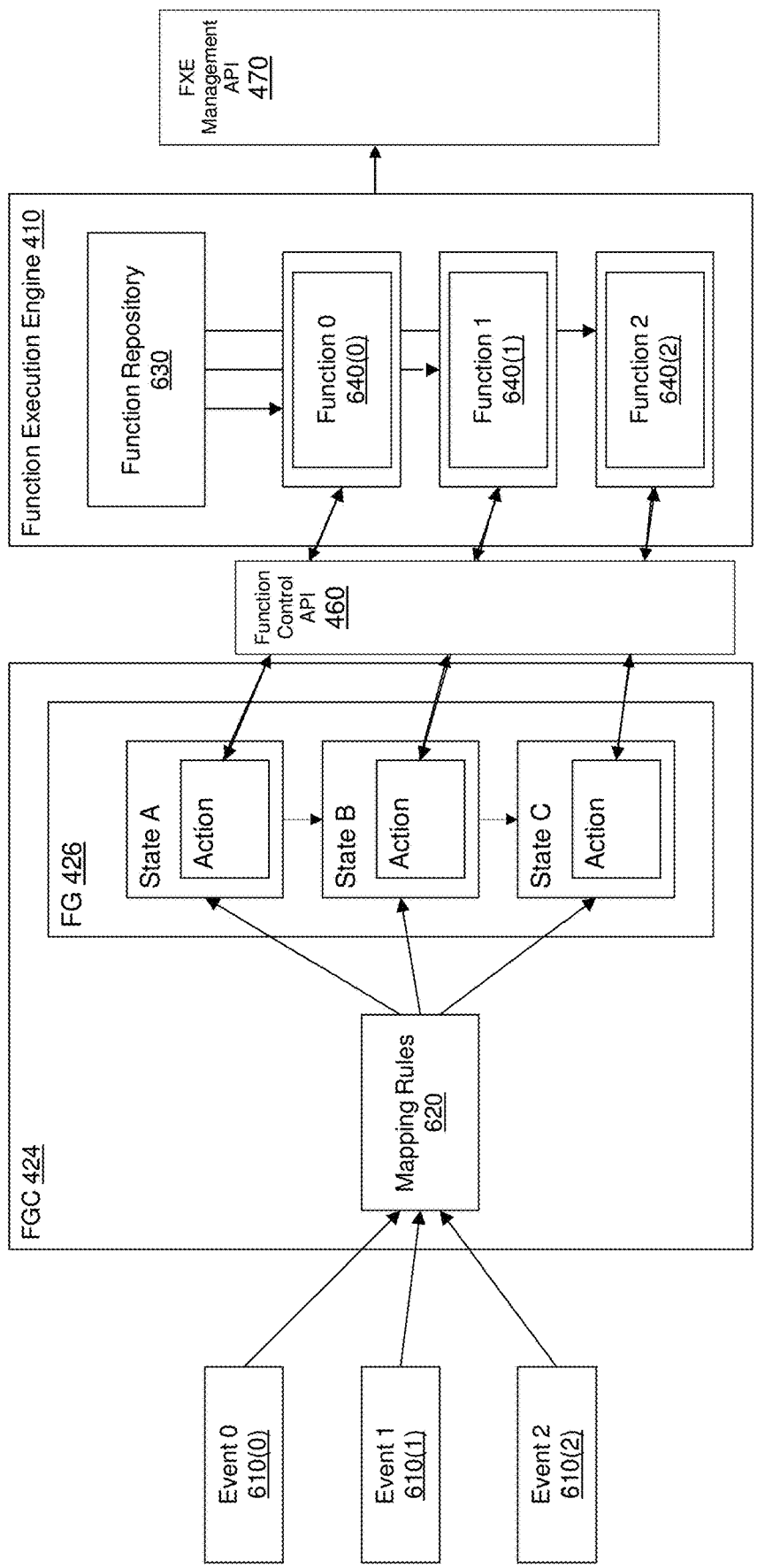
FIG. 6 illustrates the invocation of cloud-hosted functions, in accordance with one embodiment.

FIG. 6 illustrates the invocation of cloud-hosted functions, in accordance with one embodiment. As shown in FIG. 6, events 610 are generated and transmitted to a FGC 424 by one or more event mapping agents 442. The FGC 424 includes a set of mapping rules 620 that map events received from the event mapping agent(s) 442 to a particular FG instance 426 managed by the FGC 424. An FG instance 426 manages the execution of the state machine model, including transmitting requests to execute a cloud-hosted function to the function execution engine 410. Again, the state machine model within the FG instance 426 tracks the current state, monitors events received from the event mapping agent(s) 442, triggers execution of one or more actions within each state in response to events, and transitions to new states.

The function execution engine 410 includes a function repository 630 that stores and manages images of cloud functions. When the function execution engine 410 receives a request to instantiate a cloud-hosted function 640, the function execution engine 410 instantiates (i.e. creates an executable instance of) the cloud hosted-function 640 by creating a container for the function and then loading a function image into the container for execution. A container is a software partition that virtualizes an operating environment for a software package. In contrast to a virtual machine, a container virtualizes the environment provided by host OS while not including separate instances of the kernel(s), driver(s), and shared libraries of the host OS. Thus, software executed within a particular container is isolated from software executed in another container. The container will be allocated the necessary resources for execution, such as memory and non-volatile storage, but multiple containers share a host operating system and, therefore, the footprint of each container is much smaller than with using separate virtual machines.

So, once a container is provisioned, the function execution engine 410 loads a function image from the function repository 630 into the container. The function image includes the code, libraries and language specific runtime needed to execute a particular function. The code may include the set of instructions that defines the function, settings of the operating environment, additional libraries utilized by the code that may not be included in the host OS, etc. The function may be written in various runtime languages (e.g., Java, Python, C++, etc.) and compiled into a binary executable or provided as byte code that is interpreted at run-time.

In order to reduce latency associated with execution of the cloud functions, a warm start technique may be utilized. This may include instantiating a container and loading the function image for a cloud function into the container prior to receiving a request to invoke (execute) the cloud function. In one embodiment, the FGC 424 causes the function execution engine 410 to instantiate all cloud functions associated with a particular FG instance 426 when the FG instance 426 is activated. As the FG instance 426 is activated, the FGC 424 will analyze the FG instance 426 and create a list of all cloud functions 640 that are referenced within the FG instance 426. For example, the FG instance 426 may include a number of states and a number of actions within each state. Each action may specify one or more cloud functions 640 that can be called in response to an event or events. In addition, cloud functions 640 may be called in response to entering or exiting a particular state. The list of all cloud functions 640 associated with the FG instance 426 may be compiled and then the FGC 424 may transmit a request to the function execution engine 410 to instantiate each of the cloud functions associated with the FG instance 426. Consequently, when an FG instance 426 is activated by the FGC 424, all of the cloud functions 640 associated with the FG instance 426 are instantiated such that the cloud function 640 is ready to execute immediately when invoked.

For example, as shown in FIG. 6, when the FG instance 426 is activated, the FGC 424 may analyze the FG instance 426 and determine that the FG 426 includes three states: State A, State B, and State C. Each state may include an action associated with a call to a particular cloud function. The action in State A may be associated with a call to a first cloud function 640(0), the action in State B may be associated with a call to a second cloud function 640(1), and the action in State C may be associated with a call to a third cloud function 640(2). When FG instance 426 is activated, the FGC instance 424 transmits a request to the function execution engine 410 to instantiate each of the first cloud function 640(0), the second cloud function 640(1), and the third cloud function 640(2). Once the request is transmitted, the FG instance 426 may cause the state machine to transition to the initial state (e.g., State A), and wait for events to proceed through the state machine model. As the state machine model reaches an action that causes a cloud function to be invoked, the FGC 424 calls the cloud function, which has already been instantiated within the function execution engine 410, and the cloud function is executed by the function execution engine 410 without delay because the cloud function image has already been loaded into a container and is waiting for the call to execute.

It will be appreciated that the number of active containers that may be instantiated at any given time may be quite large as hundreds or thousands of FG instances 426 can be active within one or more FGCs 424, each FG instance 426 causing a number of cloud functions to be instantiated within the function execution engine 410. Furthermore, each instantiated container corresponds with one instance of a particular cloud function. Therefore, if multiple FG instances 426 are activated corresponding to multiple distinct web applications, then multiple instances of similar containers for the same cloud function (e.g., for different data sets) may be instantiated within the function execution engine 410. Consequently, it will be appreciated that the number of resources required by the function execution engine 410 may be quite large, and some of the instantiated cloud functions will never be executed if certain events never cause a transition into one or more states within the state machine model associated with a particular FG instance 426.

In one embodiment, a Metric Evaluator (shown as 802 in FIG. 8) within the function execution engine 410 keeps execution metrics related to each cloud function managed within the function repository 630. A metric value is calculated for each cloud function that determines whether the function execution engine 410 will perform a warm start for a particular cloud function. In one embodiment, the metric value is based on the exponential moving average of the inter-arrival time of events that trigger the cloud function. If the exponential moving average of the inter-arrival time is large, then the metric is given a lower value, but if the exponential moving average of the inter-arrival time is small, then the metric is given a higher value. The function execution engine 410 may compare the metric value to a threshold value in order to determine whether to perform a warm start for the cloud function. Consequently, only those cloud functions having metric values above the threshold value will be instantiated when an FG instance 426 is activated. All other cloud functions associated with the FG instance 426 (i.e., those cloud functions associated with a metric value below the threshold value) will be instantiated when a request to invoke the cloud function is received (i.e., at the time of execution). Thus, warm start will be enabled for some cloud functions and not others, which will reduce the amount of resources that are allocated to cloud function containers at any given time.

In one embodiment, the metric value is based on multiple statistics associated with a cloud function. The statistics may include, but are not limited to, a frequency of invocation of instances of the cloud-hosted function, a size of the function image corresponding with the cloud-hosted function, a size of the memory allocated within the container for the cloud-hosted function, an average execution time for a plurality of instances of the cloud-hosted function, and an exponential moving average of the inter-arrival time of events that trigger the cloud-hosted function. The larger the size of the function image corresponding with the cloud-hosted function, the higher the metric value. Smaller function images will take less time to load from non-volatile storage into the memory associated with a new container than larger function images. In addition, the larger the amount of memory allocated to the cloud-hosted function, the more memory time (i.e., GB·sec) will be used by the cloud-hosted function. Therefore, larger functions, or functions associated with larger memory allocations, will have a higher latency associated with instantiation, and warm starting larger functions will produce a bigger benefit to the end user than warm starting smaller functions. The longer the average execution time for a plurality of instances of the cloud-hosted function, the lower the metric value. For cloud functions that take a long time to execute, on average, the ratio of instantiation time to invocation time is lower. Latency associated with the instantiation is less noticeable if the execution time of the cloud-hosted function is longer. Therefore, reducing the latency of cloud-hosted functions associated with longer execution times is less noticeable to an end user. The individual metrics mentioned above are aggregated into a single metric, which is compared to a threshold value to determine whether the cloud-hosted function should be instantiated For example, individual metrics may be combined according to the following weighted formula:

$$m_{agg} = \Sigma_i w_i m_i, \quad\quad\quad (Eq. 1)$$

where $m_i$ is a particular individual metric value, $w_i$ is a corresponding weight for the individual metric value, and $m_{agg}$ is the combined aggregate metric value.

In one embodiment, the function execution engine 410 is configured with a maximum hold time associated with the warm start mode. Again, instantiation of a cloud-hosted function may be triggered by the activation of a FG instance 426. However, not all functions instantiated in the warm start mode may be invoked by the FG instance 426 before the FG instance 426 is terminated. For example, a state machine model may include multiple branches through the state machine and transition into some states may never occur depending on the order of various events. In such cases, the resources allocated to the instance of the cloud function (i.e., the container) may need to be freed so they can be allocated to a different instance of that cloud function or a different cloud function. In this case, the maximum hold time may determine when the function execution engine 410 frees the resources with a previously instantiated container for the cloud function. If the time between receiving the request to instantiate the cloud function and the current time exceeds the maximum hold time, then the resources associated with that container are freed by the function execution engine 410. If a request to invoke that cloud function is received after the resources for the container are freed, then a new container is allocated to the cloud function and the function image will be loaded into the container in response to receiving the request to invoke the cloud function. The maximum hold time ensures that resources are not tied up indefinitely for cloud functions that are never invoked.

In one embodiment, the duration of cloud functions are used to adjust the metric for the cloud function. If specific cloud functions are instantiated, but the delay between instantiation and invocation exceeds the maximum hold time, then the metric value is reduced such that warm start mode will not be used for that cloud function in the future. Thus, the metric value reflects how often a particular cloud function is invoked within the maximum hold time from the time of instantiation. Cloud functions that may be invoked at a time that exceeds the maximum hold time are less likely to be warm started because the resources allocated to those cloud functions at instantiation are freed up and then need to be reallocated in response to the request to invoke the cloud function. Consequently, the warm start is ineffective for cloud functions that have a highly variable and longer delay between instantiation and invocation.

Figure 7:
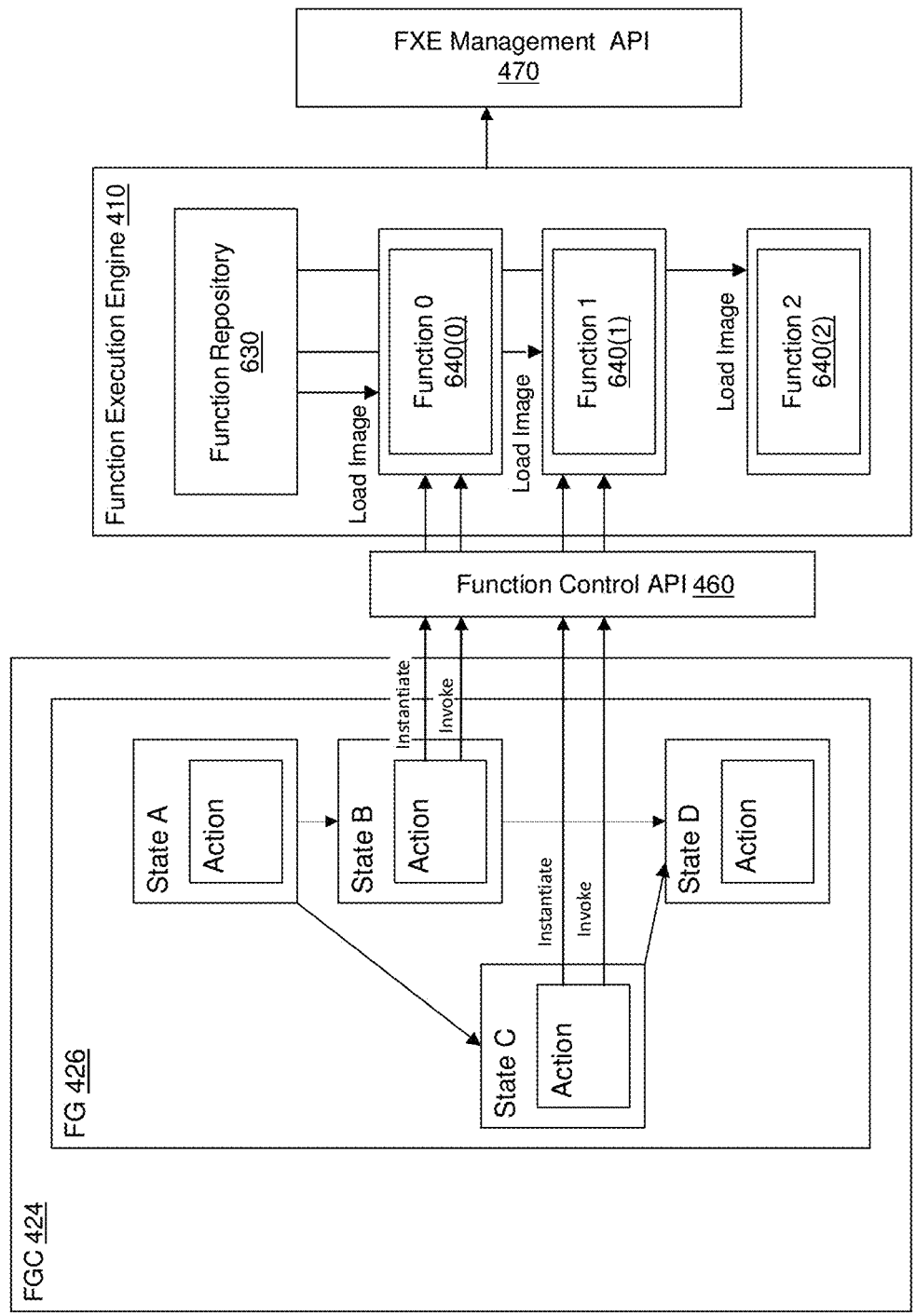
FIG. 7 illustrates the invocation of cloud-hosted functions, in accordance with another embodiment.

FIG. 7 illustrates the invocation of cloud-hosted functions, in accordance with another embodiment. As described above, all cloud functions associated with a particular FG instance 426 will be instantiated when the FG instance 426 is activated. However, this may be an inefficient use of resources because the time between instantiation and execution can be large depending on the ordering and number of states in the state machine model as well as the time required to transition to particular states, which can be dependent on the timing of certain events. Therefore, in another embodiment, cloud functions are instantiated as state transitions occur rather than directly when the FG instance 426 is activated. In other words, cloud functions are instantiated only when those particular cloud functions have a high probability of being invoked sometime in the near future.

In one embodiment, the FGC 424 keeps state information associated with each FG instance 426 in one or more data structures when the FG instance 426 is activated. The function graph state machine, by definition, includes all state and state transition information, and therefore may also include, for each state defined by the FG instance 426 in the state machine model, an identifier of all states that can be reached by a transition from that particular state. In other words, the state information may include a list of next-states for each state defined by the FG instance 426 in the state machine model. As the FG instance 426 transitions to a new state (i.e., enters a state), the FGC 424 searches the state information to find any states that could be transitioned to from the current state. The FGC 424 then determines if any cloud functions are associated with these next-states. If any cloud functions are associated with one or more of the next-states, then the FGC 424 will transmit an instantiation request for the cloud function to the function execution engine 410 in order to warm start those cloud functions. Thus, a cloud function is only instantiated when a potential transition to a state associated with the cloud function is possible from the current state.

In another embodiment, further analysis of the state machine model can determine which of the next-states are most likely to be reached from a particular state. For example, one transition may be associated with a normal workflow whereas another transition may be associated with an abnormal workflow. Analysis of statistics about how often a particular transition occurs over many instances of the FG instance 426 may assist in determining which states are more likely next-states and which states are less likely next-states. In some cases, cloud functions may only be instantiated if the probability of transitioning to that next-state is above some threshold value. For example, if the transition from a state to a next-state occurs more than 40% of the time where there are at least two transitions from that state to one of two or more next-states, then that state is considered a more likely next-state and cloud functions of the more likely next-state may be instantiated.

This just-in-time warm start mode will reduce the number of resources allocated to cloud functions by the function execution engine 410 when compared to instantiating all cloud functions associated with an FG instance 426 when the FG instance 426 is activated. The just-in-time warm start mode will also help reduce the delay between instantiation and invocation for all functions associated with states in a state machine model.

In one embodiment, the next-states with associated functions for "early" instantiation are limited to all states within one transition of a particular state. For example, as shown in FIG. 7, State A is the initial state of the FG instance 426. State B and State C are next-states one transition away from State A. State D is at least two transitions away from State A, so State D is not a next-state corresponding to State A. However, in another embodiment, the next-states are limited to all states within a threshold number of transitions of a particular state. For example, if the next-states are limited to all states within two transitions of a particular state, then State B, State C, and State D are next-states corresponding to State A because State D is two transitions away from State A. For FG instances 426 with a large number of states, especially where the state machine model may transition between states in a short period, the threshold number of transitions may be increased to a number greater than one such that cloud functions are instantiated two or more state transitions ahead of time.

This just-in-time warm start mode helps to reduce the allocated resources required for implementing warm start of cloud functions. Utilizing intelligent allocation of resources in this just-in-time warm start mode reduces latency associated with cloud function execution while attempting to avoid problems associated with limited system resources. In other words, a limited number of system resources (e.g., memory computation time) places an upper limit on the total number of containers that can be allocated within the system at any given time. At some point, the number of allocated containers will exceed the total available resources, and then management of the shared resources begins to reduce the effectiveness of the warm start mode, as containers that are not active may need to be freed to make containers available to execute a different cloud function that has been invoked.

In one embodiment, the function execution engine 410 implements an application programming interface (API) 460 for controlling the execution of cloud functions. The API 460 includes a call to request the instantiation of a cloud function. Instantiation of a cloud function includes the allocation of a container, including all of the resources associated therewith, to host the cloud function. The function image is loaded into the container from the function repository 630. The API 460 includes a call to request the invocation of the cloud function. The invocation of the cloud function refers to the execution of the cloud function within the container. If the call to request the invocation of the cloud function is received prior to the call to request the instantiation of a cloud function, then the function execution engine 410 will automatically allocate a container to the cloud function, load the function image into the container, and immediately execute the cloud function within the container. However, if a cloud function has already been instantiated, then the function execution engine 410 will simply execute the cloud function within the already allocated container.

In one embodiment, the Function Execution Engine API 460 also includes a call to explicitly free (i.e. release, such as to remove from memory, etc.) a container allocated to a particular cloud function. For example, when a state machine model terminates, the FG instance 426 is deactivated by the FGC 424, and any cloud functions associated with that FG instance 426 should be freed, even if the cloud functions were never invoked. Consequently, the FGC 424 may include functionality to explicitly release resources that were allocated to cloud functions corresponding to the FG instance 426 in order to make those resources available to other FG instances 426. The FXE management API 470 may also include functions to configure the warm start mode. For example, a function may set the maximum hold time such that the FGC 424 can adjust the length of time that a particular cloud function remains instantiated. As the number of FG instances 426 managed by a particular FGC 424 increases, the FGC 424 may decrease the maximum hold time to ensure sufficient resources are available to provide for the execution of cloud functions that are actually invoked. The maximum hold time may be dynamically adjusted by the FGC 424 in order to make the warm start mode more efficient given the actual number of FG instances 426 that are currently active. Additional functions may be included in the FXE management API 470 for managing the metrics, for example, and enabling the threshold value to compare to the metric value for a particular cloud function when determining when to service a request to instantiate a particular cloud function.

Figure 8:
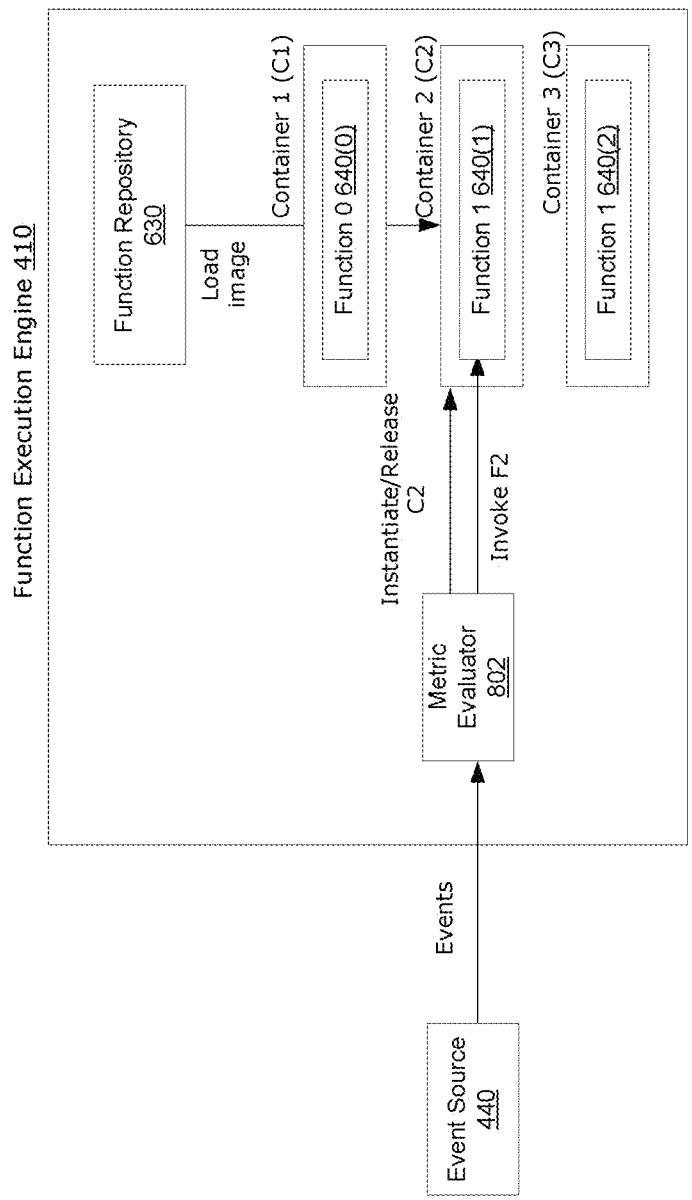
FIG. 8 illustrates the use of execution metrics related to each cloud function, in accordance with one embodiment.

FIG. 8 illustrates the use of execution metrics related to each cloud function, in accordance with one embodiment. A Metric Evaluator 802 within the function execution engine 410 keeps execution metrics related to each cloud function managed within the function repository 630. In one embodiment, the function execution engine 410 performs the evaluation of event arrival time metrics. All events originating at the event source 400 and either directly or indirectly received therefrom by the function execution engine 410 are passed through the Metric Evaluator 802 which determines when the function containers (C1, C2, C3) are to be instantiated and released. The Metric Evaluator 802 uses the image size, the type of runtime language, and the inter-arrival time of events to determine when to instantiate and release the function containers. The Metric Evaluator 802 determines whether to instantiate or release each container, and also when to invoke the cloud function.

Figure 9:
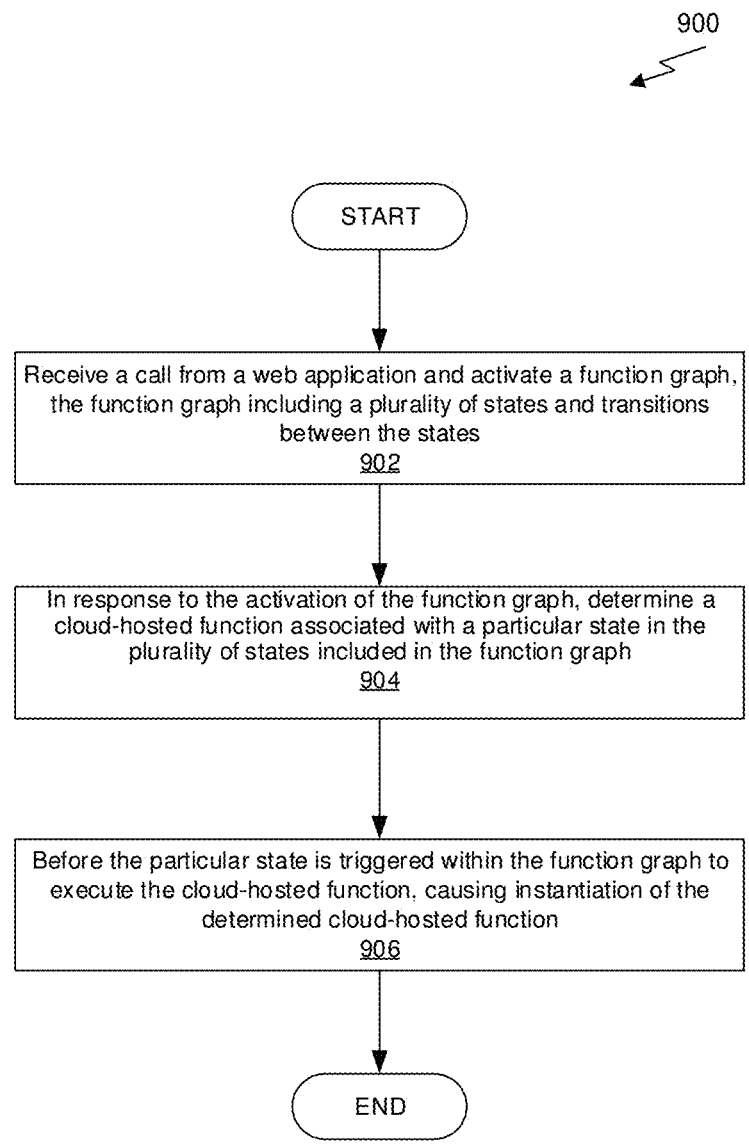
FIG. 9 is a flowchart of a method for providing a warm start technique for cloud-hosted functions, in accordance with one embodiment.

FIG. 9 is a flowchart of a method 900 for a warm start technique for cloud-hosted functions, in accordance with one embodiment. The method 900 may be performed by hardware, software, or a combination of hardware and software. In one embodiment, the method 900 is implemented, at least in part, by an FGC 424 and/or a function execution engine 410 of a cloud architecture 400. For example, the method 900 may be performed in the context of any of the embodiments and/or definitions provided above.

At step 902, a function graph is activated (i.e. invoked, called, etc.), where the function graph includes a plurality of states and transitions between the states. In one embodiment, the function graph may be activated within a cloud computing environment (i.e. cloud architecture 400). Optionally, the function graph may be activated from a manual command (e.g. through a command line interface) or from a triggering event (e.g. output by an event source). Just by way of example, the function graph may be activated by triggering a first state in the plurality of states included in the function graph.

At step 904, in response to the activation of the function graph, a cloud-hosted function associated with a particular state in the plurality of states included in the function graph is determined. In one embodiment, the particular state may be any state in the plurality of states included in the function graph. With respect to this embodiment then, all cloud-hosted functions associated with the plurality of states included in the function graph may be determined directly upon the activation of the function graph, for instantiation thereof as described in more detail below.

In another embodiment, the cloud-hosted function may be determined by: identifying the current state within the function graph, determining the particular state as predefined number of transitions away within the function graph from the current state, and identifying the cloud-hosted function as associated with the particular state. As a further option, the predefined number of transitions may be one, such the particular state is determined as a next state to which the current state is capable of transitioning within the function graph.

In yet another embodiment, the cloud-hosted function may be determined by: identifying the current state within the function graph, determining, from the current state, a plurality of possible transition paths within the function graph, predicting that a particular transition path of the plurality of possible transition paths will be used in association with the activation of the function graph, determining the particular state as included in the particular transition path, and identifying the cloud-hosted function as associated with the particular state. As a further option, the particular transition path may be predicted as being used in association with the activation of the function graph, based on historical information collected from prior activations of the function graph.

In still yet another embodiment, the cloud-hosted function may be determined by: identifying the current state within the function graph, and determining that the current state includes a command to instantiate the cloud-hosted function. For example, the current state may be annotated with a command to instantiate the cloud-hosted function. In this embodiment, the current state is different from the particular state associated with the cloud-hosted function.

At step 906, before the particular state is triggered within the function graph to execute the cloud-hosted function, instantiation of the determined cloud-hosted function is caused (i.e. creation of an executable instance of the cloud-hosted function is instructed, requested, commanded, etc.). In one embodiment, instantiating the determined cloud-hosted function includes creating an instance of the cloud-hosted function within a cloud computing environment. For example, instantiating the determined cloud-hosted function may include creating a container for the cloud-hosted function within a cloud computing environment, the container being an execution environment for cloud-hosted function. As a further option, instantiating the determined cloud-hosted function may further include loading an image of the cloud-hosted function within the container. As another option, instantiating the determined cloud-hosted function further may include initializing a runtime for the cloud-hosted function.

Furthermore, while not shown, it should be noted that the cloud-hosted function is instantiated for providing a warm-start for a subsequent execution of the cloud-hosted function. Thus, the cloud-hosted function may be executed when the particular state is triggered within the function graph.

Figure 10:
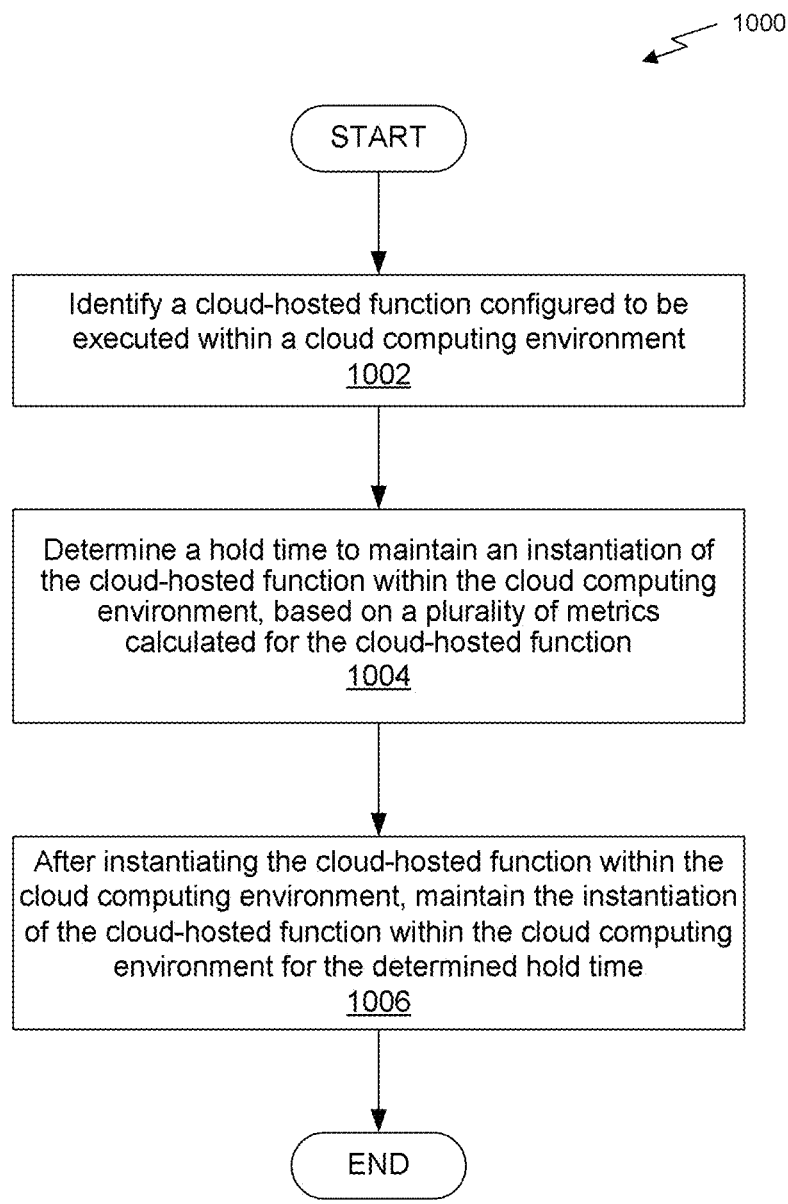
FIG. 10 is a flowchart of a method for providing a warm start technique for cloud-hosted functions, in accordance with one embodiment.

FIG. 10 is a flowchart of a method 1000 for a warm start technique for cloud-hosted functions, in accordance with one embodiment. The method 1000 may be performed by hardware, software, or a combination of hardware and software. In one embodiment, the method 1000 is implemented by a function execution engine 410 of a cloud architecture 400. For example, the method 1000 may be performed in the context of any of the embodiments and/or definitions provided above.

At step 1002, a cloud-hosted function configured to be executed within a cloud computing environment is identified. This operation 1002 may occur when the cloud-hosted function is instantiated or executed. At step 1004, a hold (preservation) time to maintain an instantiation of the cloud-hosted function within the cloud computing environment is determined, based on a plurality of metrics calculated for the cloud-hosted function. In one embodiment, the hold time to maintain the instantiation of the cloud-hosted function within the cloud computing environment may be determined utilizing a predefined function that: receives, as input, the metrics calculated for the cloud-hosted function, processes the metrics to determine the length of time, and outputs the determined hold time. The metrics may include, for example, an image size of the cloud-hosted function, memory allocation required for the cloud-hosted function, an execution duration for the cloud-hosted function, an interval between the sequential of events that trigger the cloud-hosted function, etc. Further, the metrics may be calculated using historical information collected from prior event arrivals that trigger the cloud-hosted function within the cloud computing environment.

At step 1006, after instantiating the cloud-hosted function within the cloud computing environment, the instantiation of the cloud-hosted function is maintained within the cloud computing environment for the determined hold time.

As also noted above with reference to FIG. 9, instantiating the cloud-hosted function within the cloud computing environment may include creating a container for the cloud-hosted function within a cloud computing environment, the container being an execution environment for cloud-hosted function, loading an image of the cloud-hosted function within the container, and initializing a runtime for the cloud-hosted function. With respect to this embodiment, maintaining the instantiation of the cloud-hosted function within the cloud computing environment may include maintaining the container, the image of the cloud-hosted function within the container, and the runtime.

As a further option to the above described method 1000, it may be determined that the hold time has elapsed without the cloud-hosted function being executed within the cloud computing environment. In this case, in response to determining that the hold time has elapsed without the cloud-hosted function being executed within the cloud computing environment, the instantiation of the cloud-hosted function may be removed from within the cloud computing environment.

To this end, in some optional embodiments, one or more of the foregoing features of the aforementioned system, computer-implemented method, and/or non-transitory computer-readable media may provide a warm start technique for cloud-hosted functions. This warm start technique may reduce latency associated with a time to execution of a cloud-hosted function, such as by instantiating the cloud-hosted function ahead of time (in anticipation of a later requested execution of the cloud-hosted function), as disclosed with respect to FIG. 9, and/or maintaining an already instantiated cloud-hosted function for a hold time that is dynamically determined for the cloud-hosted function (in anticipation of a later requested execution of the cloud-hosted function being made during that hold time), as disclosed with respect to FIG. 10. It should be noted that the aforementioned potential advantages are set forth for illustrative purposes only and should not be construed as limiting in any manner.

Figure 11:
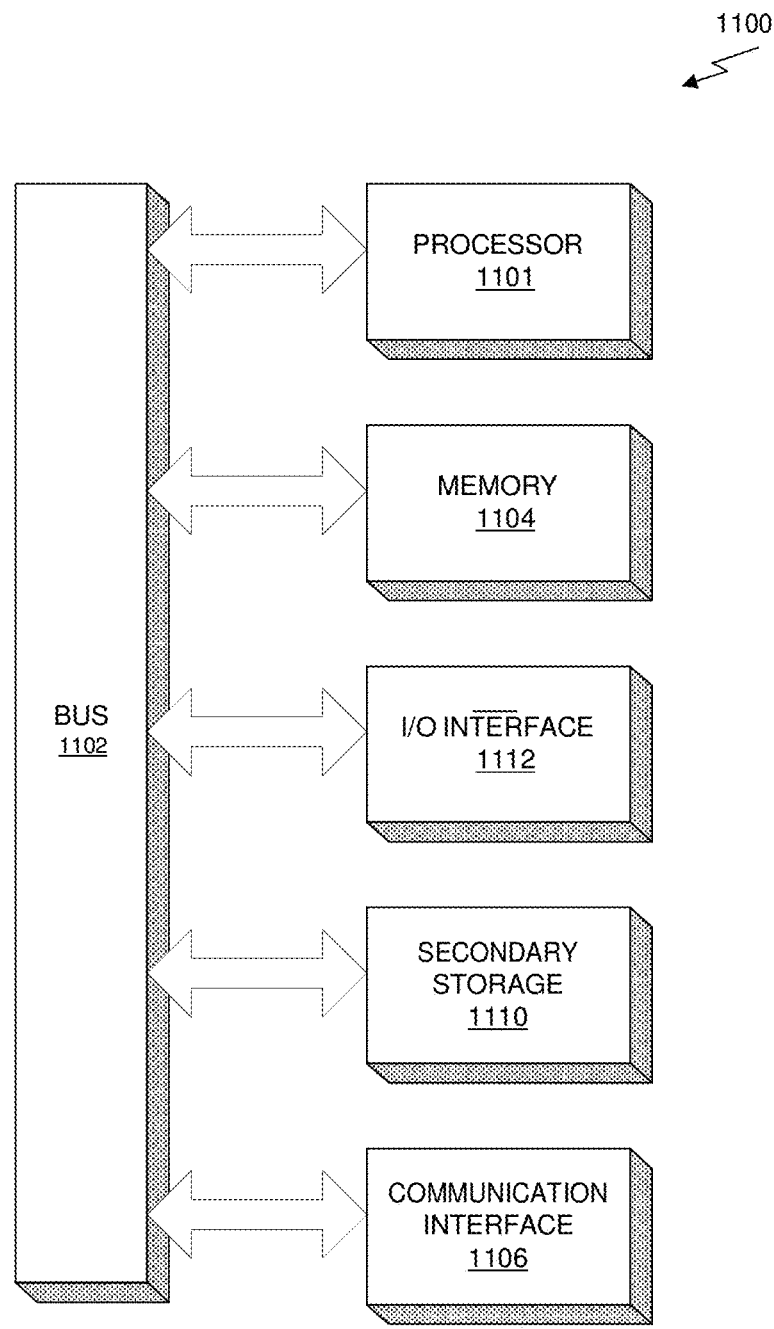
FIG. 11 illustrates an exemplary system in which the various architecture and/or functionality of the various previous embodiments may be implemented.

FIG. 11 illustrates an exemplary system 1100 in which the various architecture and/or functionality of the various previous embodiments may be implemented. As shown, a system 1100 is provided including at least one processor 1101 that is connected to a communication bus 1102. The communication bus 1102 may be implemented using any suitable protocol, such as PCI (Peripheral Component Interconnect), PCI-Express, AGP (Accelerated Graphics Port), HyperTransport, or any other bus or point-to-point communication protocol(s). The system 1100 also includes a memory 1104. Control logic (software) and data are stored in the memory 1104 which may take the form of random access memory (RAM).

The system 1100 also includes an input/output (I/O) interface 1112 and a communication interface 1106. User input may be received from the input devices 1112, e.g., keyboard, mouse, touchpad, microphone, and the like. In one embodiment, the communication interface 1106 may be coupled to a graphics processor (not shown) that includes a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1100 may also include a secondary storage 1110. The secondary storage 1110 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the memory 1104 and/or the secondary storage 1110. Such computer programs, when executed, enable the system 1100 to perform various functions. The memory 1104, the storage 1110, and/or any other storage are possible examples of computer-readable media.

In one embodiment, the architecture and/or functionality of the various previous figures may be implemented in the context of the processor 1101, a graphics processor coupled to communication interface 1106, an integrated circuit (not shown) that is capable of at least a portion of the capabilities of both the processor 1101 and a graphics processor, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1100 may take the form of a desktop computer, laptop computer, server, workstation, game consoles, embedded system, and/or any other type of logic. Still yet, the system 1100 may take the form of various other devices including, but not limited to a personal digital assistant (PDA) device, a mobile phone device, a television, etc.

Further, while not shown, the system 1100 may be coupled to a network (e.g., a telecommunications network, local area network (LAN), wireless network, wide area network (WAN) such as the Internet, peer-to-peer network, cable network, or the like) for communication purposes.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:
a non-transitory memory storage comprising instructions; and
one or more processors in communication with the memory, wherein the one or more processors execute the instructions to:
receive a call from a web application;
in response to the received call, activate a function graph comprising a collection of functions associated with the web-application, the function graph including a plurality of states and transitions between the states;
in response to the activation of the function graph, determine a cloud-hosted function associated with a particular state in the plurality of states included in the function graph; and
before the particular state is triggered within the function graph to execute the cloud-hosted function, cause instantiation of the determined cloud-hosted function.

2. The system of claim 1, wherein the function graph is activated within a cloud computing environment from a manual command or from a triggering event.

3. The system of claim 1, wherein the particular state in the plurality of states included in the function graph is any state in the plurality of states included in the function graph, such that all cloud-hosted functions associated with the plurality of states included in the function graph are determined directly upon the activation of the function graph for instantiation thereof.

4. The system of claim 1, wherein the cloud-hosted function is determined by:
identifying a current state triggered within the function graph;
determining the particular state as one transition away within the function graph from the current state; and
identifying the cloud-hosted function as associated with the particular state for instantiation thereof.

5. The system of claim 1, wherein the cloud-hosted function is determined by:
identifying a current state within the function graph;
determining, from the current state, a plurality of possible transition paths within the function graph;
predicting that a particular transition path of the plurality of possible transition paths will be used in association with the activation of the function graph;
determining the particular state as included in the particular transition path; and
identifying the cloud-hosted function as associated with the particular state for instantiation thereof.

6. The system of claim 5, wherein the particular transition path is predicted as being used in association with the activation of the function graph, based on historical statistical information collected from prior activations of the function graph.

7. The system of claim 1, wherein the instantiation of the determined cloud-hosted function includes:
creating a container for the cloud-hosted function within a cloud computing environment, the container being an execution environment for the cloud-hosted function;
loading an image of the cloud-hosted function within the container; and
initializing a runtime for the cloud-hosted function.

8. The system of claim 1, wherein the cloud-hosted function is executed when the particular state is triggered within the function graph.

9. The system of claim 1, wherein when it is determined that the function graph has terminated, the instantiation of the cloud-hosted function is released from within a cloud computing environment.

10. The system of claim 1 wherein the function graph is for an application.

11. A non-transitory computer-readable media storing computer instructions, that when executed by one or more processors, cause the one or more processors to perform the steps of:
receiving a call from a web application;
in response to receiving the call from the web application, activating a function graph comprising a collection of functions associated with the web application, the function graph including a plurality of states and transitions between the states;
in response to the activation of the function graph, determining a cloud-hosted function associated with a particular state in the plurality of states included in the function graph; and
before the particular state is triggered within the function graph to execute the cloud-hosted function, causing instantiation of the determined cloud-hosted function.

12. The non-transitory computer-readable media of claim 11, wherein the function graph is activated within a cloud computing environment from a manual command or from a triggering event.

13. The non-transitory computer-readable media of claim 11, wherein the particular state in the plurality of states included in the function graph is any state in the plurality of states included in the function graph, such that all cloud-hosted functions associated with the plurality of states included in the function graph are determined directly upon the activation of the function graph for instantiation thereof.

14. The non-transitory computer-readable media of claim 11, wherein the cloud-hosted function is determined by:
  identifying a current state triggered within the function graph;
  determining the particular state as one transition away within the function graph from the current state; and
  identifying the cloud-hosted function as associated with the particular state for instantiation thereof.

15. The non-transitory computer-readable media of claim 11, wherein the cloud-hosted function is determined by:
  identifying a current state within the function graph;
  determining, from the current state, a plurality of possible transition paths within the function graph;
  predicting that a particular transition path of the plurality of possible transition paths will be used in association with the activation of the function graph;
  determining the particular state as included in the particular transition path; and
  identifying the cloud-hosted function as associated with the particular state for instantiation thereof.

16. The non-transitory computer-readable media of claim 15, wherein the particular transition path is predicted as being used in association with the activation of the function graph, based on historical statistical information collected from prior activations of the function graph.

17. The non-transitory computer-readable media of claim 11, wherein the instantiation of the determined cloud-hosted function includes:
  creating a container for the cloud-hosted function within a cloud computing environment, the container being an execution environment for the cloud-hosted function;
  loading an image of the cloud-hosted function within the container; and
  initializing a runtime for the cloud-hosted function.

18. The non-transitory computer-readable media of claim 11, wherein the cloud-hosted function is executed when the particular state is triggered within the function graph.

19. The non-transitory computer-readable media of claim 11, wherein when it is determined that the function graph has terminated, the instantiation of the cloud-hosted function is released from within a cloud computing environment.

* * * * *